UNITED STATES PATENT OFFICE.

AXEL RUDOLF LINDBLAD, OF LUDVIKA, SWEDEN.

METHOD FOR PRODUCTION OF CYANOGEN COMPOUNDS.

1,264,949.  Specification of Letters Patent.  Patented May 7, 1918.

No Drawing.  Application filed June 1, 1916.  Serial No. 101,039.

*To all whom it may concern:*

Be it known that I, AXEL RUDOLF LINDBLAD, engineer, subject of the King of Sweden, residing at Ludvika, in the Kingdom of Sweden, have invented certain new and useful Improvements in Methods for Production of Cyanogen Compounds, of which the following is a specification.

The present invention has for its object novel methods for the production of alkali cyanogen compounds. According to the present invention, native or artificial alkali silicates are used as the alkali-bearing raw material, which material, together with carbon or other reducing agent, is heated in an electric furnace and thereby exposed to the action of nitrogen. The reaction temperature in the furnace is kept so high, that the cyanogen compounds formed in the process may be drawn off in the form of vapor or smoke, together with the carbonic oxid and other gases formed in the process, while the slag formed is tapped off in a fluid state in the usual way.

Experiments have been carried out before to produce cyanogen compounds in a shaft furnace with the use of alkali silicate as raw material, but without good results. The heat necessary for the process being generated by combustion, a blast had to be supplied which was disadvantageous for the formation of cyanogen compounds, because the carbonic oxid formed thereby decomposed a part of the product, and besides this the comparatively great amount of gases thereby formed, made the condensation and the collecting of the cyanogen compounds formed difficult. By carrying out the process in an electric furnace according to the present invention, said difficulties are obviated and great advantages gained over the processes hitherto used, and therefore the present invention forms a valuable technical advance over similar methods hitherto used.

By the use of an electric furnace for the process in question, it is now possible and without any difficulty, to regulate the temperature in such a way, that the cyanogen compound formed, as pointed out above, may be drawn off from the furnace in the form of vapor or smoke together with other gases formed in the process, while the slag is tapped off in the usual way.

By the addition of lime or a compound containing CaO the alkali is more easily driven out of the silicate, the slag obtained thereby containing calcium oxid which may be used for the manufacture of cement.

As suitable alkali silicates which may be used for the process it may, by way of example, be mentioned that different kinds of feldspar and mica and also such rocks or weathering products which contain such minerals may be used to advantage, and also all kinds of minerals or rocks or artificial products containing alkali silicates may be used but to less advantage. A material which under certain circumstances is entirely suitable for the purpose is the widely distributed alum-slate. As this material very often contains a considerable amount of carbon, the quantity of carbon which otherwise must be added to the charge may, by the use of this material, be reduced or saved. The hydrocarbons and the like products contained in the alum-slate may, of course if found suitable during the process, be collected or utilized.

In order to make the invention better understood there is given by way of example, in the following description, the production of alkali cyanid by the use of feldspar as raw material. For the sake of simplicity, it is hereby assumed that the raw material consists of pure potash feldspar, $K_2O, Al_2O_3, 6SiO_2$.

The feldspar is disintegrated to suitable sizes and is mixed with carbon and sufficient lime, to produce a readily fusible slag and the mixture charged into an electric furnace and there heated to a suitable temperature by means of electric current. A greater or less part of the alkali is thereby reduced according to the formula

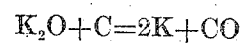
$$K_2O + C = 2K + CO$$

The metal reduced combines with carbon and nitrogen forming potassium-cyanid, KCN, which, together with other gases formed in the process in the form of vapor or smoke, escapes from the furnace and is collected. The alumina and silicic acid contained in the feldspar form together with the lime added to the charge, slag which is tapped off in a usual way.

It will be understood, that in the carrying out of the process on an industrial scale, certain deviations are made from the process described. The raw material used always contains more or less impurities which have an influence on the process, and the cyanogen compound is not always obtained entirely in the form of cyanid, but other cyanogen compounds, as for instance cyanates, are also formed.

In the following claims the words alkali silicate comprise native as well as artificial alkali silicates, rocks and minerals or weathering products containing alkali silicates, and the expression lime comprises lime as well as compounds containing CaO.

For carrying out the process here in question, an electric furnace of any suitable construction may be used, for instance, a furnace of the type described in my United States Patent 1,186,921, dated June 13, 1916; filed on November 18th 1914, Serial Number 872717.

Having thus described my invention, I declare that what I claim is:

1. Process for production of cyanogen compounds consisting in charging alkali silicate together with reducing agents and lime into an electric furnace, exposing the charge to the action of nitrogen while electrically heating the same to such a temperature that cyanogen compounds are formed, conducting the cyanogen compounds from the furnace together with other gaseous products formed in the process and collecting the same.

2. Process for production of cyanogen compounds consisting in charging alkali silicate together with reducing agents and lime yielding materials into an electric furnace, exposing the charge to the action of nitrogen while electrically heating the same to such a temperature, that cyanogen compounds are formed, conducting the cyanogen compounds from the furnace together with other gaseous products formed in the process and collecting the same.

3. Process for production of cyanogen compounds consisting in charging alkali silicate together with carbon and lime-containing mineral into an electric furnace, exposing the charge to the action of nitrogen while electrically heating the same to such a temperature that cyanogen compounds are formed, conducting the cyanogen compounds from the furnace together with other gaseous products formed in the process and collecting the same.

4. Process for production of cyanogen compounds consisting in charging alkali silicate together with reducing agents and lime into an electric furnace, exposing the charge to the action of nitrogen while electrically heating the same to such a temperature that cyanogen compounds are formed, conducting the cyanogen compounds from the furnace together with other gaseous products formed in the process, collecting the same, and tapping off the slag in a fluid state.

5. Process for production of cyanogen compounds consisting in charging alkali silicate together with reducing agents and lime into an electric furnace, exposing the charge to the action of nitrogen while electrically heating the same to such a temperature that cyanogen compounds are formed, conducting the cyanogen compounds from the furnace together with other gaseous products formed in the process and collecting the same and tapping off the slag in a fluid state, such quantity of lime being mixed with the charge that the slag formed will be suitable for the manufacturing of cement.

6. A process for the production of cyanogen compounds consisting in charging alumslate together with reducing agents and lime into an electric furnace, exposing the charge to the action of nitrogen while electrically heating the same to such a temperature, that cyanogen compounds are formed, conducting the cyanogen compounds from the furnace together with other gaseous products formed in the process and collecting the same.

In witness whereof I have hereunto set my hand in presence of two witnesses.

AXEL RUDOLF LINDBLAD.

Witnesses:
 AUG. HAGELIN,
 ALICE NIHLON.